(12) United States Patent
Challener et al.

(10) Patent No.: US 10,049,215 B2
(45) Date of Patent: Aug. 14, 2018

(54) APPARATUS AND METHOD FOR PREVENTING ACCESS BY MALWARE TO LOCALLY BACKED UP DATA

(71) Applicant: The Johns Hopkins University, Baltimore, MD (US)

(72) Inventors: David C. Challener, Raleigh, NC (US); Peter S. Kruus, Clarksville, MD (US); Russell A. Fink, Laurel, MD (US); James F. Farlow, Mt. Airy, MD (US)

(73) Assignee: The Johns Hopkins University, Baltimore, MD (US)

( * ) Notice: Subject to any disclaimer, the term of this patent is extended or adjusted under 35 U.S.C. 154(b) by 167 days.

(21) Appl. No.: 15/255,551

(22) Filed: Sep. 2, 2016

(65) Prior Publication Data

US 2017/0076096 A1 Mar. 16, 2017

Related U.S. Application Data (60) Provisional application No. 62/218,757, filed on Sep. 15, 2015.

(51) Int. Cl.
*G06F 21/00* (2013.01)
*G06F 21/56* (2013.01)
(Continued)

(52) U.S. Cl.
CPC ........ *G06F 21/567* (2013.01); *G06F 11/1469* (2013.01); *G06F 21/53* (2013.01);
(Continued)

(58) Field of Classification Search
None
See application file for complete search history.

(56) References Cited

U.S. PATENT DOCUMENTS 7,290,284 B1 * 10/2007 Wettergren ......... G06F 21/6218
711/163
7,366,859 B2 4/2008 Per et al.
(Continued)

FOREIGN PATENT DOCUMENTS

WO 2012087462 6/2012

OTHER PUBLICATIONS

Max Maxfield, "Secure Your Data With Self-Encrypting Drives (SEDs)," Embedded, Jun. 28, 2016, pp. 1-5, available at: http://www.embedded.com/electronics-blogs/max-unleased-and-unfettered/4442291/Secure-your-data-with-self-encrypting-drives—SEDs-#.

(Continued)

*Primary Examiner* — Eric Chen
(74) *Attorney, Agent, or Firm* — Todd R. Farnsworth (57) ABSTRACT

A method for providing malware protection in connection with processing circuitry including hardware resources and software resources managed by a primary operating system may include providing a trusted operating system to control access to a portion of a local storage area of the hardware resources. In this context, only the trusted operating system is configured to enable writing to the portion of the local storage area. The method may further include storing backup files for the primary operating system in the portion of the local storage area responsive to the trusted operating system granting access to write to the portion of the local storage area.

14 Claims, 7 Drawing Sheets

(51) Int. Cl.
*G06F 11/14* (2006.01)
*G06F 21/53* (2013.01)
G06F 11/00 (2006.01)
G06F 12/14 (2006.01)
G06F 12/16 (2006.01)
G08B 23/00 (2006.01)

(52) U.S. Cl.
CPC .... *G06F 2201/84* (2013.01); *G06F 2221/034* (2013.01); *G06F 2221/2141* (2013.01); *G06F 2221/2147* (2013.01); *G06F 2221/2149* (2013.01); *G06F 2221/2151* (2013.01)

(56) References Cited

U.S. PATENT DOCUMENTS

| | | | |
|---|---|---|---|
| 7,380,140 B1* | 5/2008 | Weissman | G06F 21/575 709/213 |
| 8,793,217 B2 | 7/2014 | Karonde et al. | |
| 8,856,542 B2 | 10/2014 | Tatarinov et al. | |
| 8,856,553 B2 | 10/2014 | Lyakhovitskly et al. | |
| 9,129,114 B2 | 9/2015 | Hamid | |
| 9,202,059 B2 | 12/2015 | Bhansali et al. | |
| 9,256,734 B2* | 2/2016 | Buer | G06F 21/53 |
| 9,317,686 B1 | 4/2016 | Ye et al. | |
| 2007/0266444 A1* | 11/2007 | Segal | G06F 21/554 726/27 |
| 2013/0067576 A1 | 3/2013 | Niemela | |
| 2014/0020083 A1 | 1/2014 | Fetik | |

OTHER PUBLICATIONS

"How to Stay Protected Against Ransomware," A SOPHOS White paper, May 2016, pp. 1-12.

"TCG Storage Architecture Core Specification," Trusted Computing Group, Specification Version 2.01, Revision 1.00, Aug. 5, 2015, pp. 1-306.

"TCG Storage Security Subsystems Class: Opal," Trusted Computing Group, Specification Version 2.01, Revision 1.00, Aug. 5, 2015, pp. 1-80.

Kim Zetter, "4 Ways to Protect Against the Very Real Threat of Ransomware," Wired, May 13, 2016 pp. 1-12, available at: https://www.wired.com/2016/05/4-ways-protect-ransonware-youre-target.

Robert Thibadeau, PH.D., "Personal Cloud Self-Protecting Self-Encrypting Storage Devices," Bright Plaza, Inc. & School of Computer Science, Carnegie Mellon University, Copyright Bright Plaza, Inc., SNIA 2015, pp. 1-20.

* cited by examiner

APPARATUS AND METHOD FOR PREVENTING ACCESS BY MALWARE TO LOCALLY BACKED UP DATA

CROSS-REFERENCE TO RELATED APPLICATIONS

This application claims the benefit of U.S. Provisional Application No. 62/218,757 filed on Sep. 15, 2015, the entire contents of which are hereby incorporated herein by reference.

TECHNICAL FIELD

Example embodiments generally relate to malware defense and, in particular, relate to a mechanism by which to combat malware.

BACKGROUND

With the advent of computers and communication networks, the ability to generate, store, utilize, distribute, publish or otherwise share content and information has vastly improved. This has further led to the routine transfer of large amounts of data, content and information between devices. While much of the material transferred between devices is exactly that which is desired by the corresponding users, malicious software (or malware) can also be transferred among devices. The malware may pose privacy or security concerns, or it may be disruptive or even destructive and costly in some situations.

In order to attempt to minimize the impact of malware, users may generate local backups of the data stored on their systems or take other measures to safeguard their data. However, ransomware is particularly dangerous since it generally gains operating system (OS) kernel access through an exploit and then uses the access to encrypt the data on the system. The key for encryption is then maintained by the owner of the malware to prevent the user from accessing the encrypted data until a ransom is paid.

Ransomware continues to get more sophisticated, and is even sometimes able to encrypt backed up copies of data. Moreover, recent attacks on government agencies, hospitals and personal users have occurred and, in some of those cases, the FBI has been reported as actually advising some victims to pay the ransom.

One technique that has been suggested as a defense is to keep anti-malware software up to date, keep all OS and software up to date, an avoid responding to phishing attacks, etc. However, long experience has shown that these recommendations, while helpful, are not 100% assured of providing protection against any kind of malware.

Accordingly, it may be desirable to continue to develop improved and/or more effective mechanisms by which protection against this type of malware.

BRIEF SUMMARY OF SOME EXAMPLES

Accordingly, some example embodiments may enable the provision of a solution for addressing the issues described above. In this regard, for example, some embodiments may enable the provision of a malware free environment in which backups can be periodically stored.

In one example embodiment, a method for providing malware protection in connection with processing circuitry including hardware resources and software resources managed by a primary operating system is provided. The method may include providing a trusted operating system to control access to a portion of a local storage area of the hardware resources. In this context, only the trusted operating system is configured to enable writing to the portion of the local storage area. The method may further include storing backup files for the primary operating system in the portion of the local storage area responsive to the trusted operating system granting access to write to the portion of the local storage area.

In another example embodiment, an apparatus for providing malware protection is provided. The apparatus may include processing circuitry including hardware resources and software resources managed by a primary operating system. The apparatus may further include a trusted operating system configured to control access to a portion of a local storage area of the hardware resources. The portion of the local storage area stores backup files for the primary operating system, and only the trusted operating system is configured to enable writing to the portion of the local storage area.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

As indicated above, some embodiments of the present invention may relate to limiting the ability of malicious software, particularly ransomware, to effectively operate in a computer system. In the ransomware context, the ability to backup files in a manner that is inaccessible to ransomware is often the key. However, given that ransomware typically has OS kernel access, ransomware is typically able to defeat most software driven counter measures. Accordingly, a solution to the problems posed by ransomware must protect at least one copy of all data against an adversary that has kernel level privileges. It must be assumed that the resident malware has been on the machine for some time, and has knowledge of backup strategies that have been employed. If access to backed-up data is available to be written to by the operating system (OS), then it must be assumed that such data will also be encrypted by the ransomware.

Simple solutions such as using a file system that does not overwrite older data (such as the Elephant file system), do not suffice in and of themselves, because kernel level privileges allow overwriting data below the file system (e.g., with the "dd" utility). Similarly, solutions that rely on hiding file systems or backups from the user will typically not work. Accordingly, some example embodiments may succeed where other options have failed by utilizing hardware-based technologies. In particular, by employing a hard disk that allows allocations to be defined with strict access privileges associated therewith (e.g., self-encrypting drives or Opal drives), and by employing a trusted platform module (TPM) in an integrated system, a design may be provided that ensures that the kernel never has the privilege to write to certain write-protected portions of the hard disk. The TPM guards access to the keys needed to manage the write-protected portions of the hard disk. Backup data can then be stored in these write-protected portions so that the backup data is protected from unauthorized encryption. In the context of a drive that is access restrictable based on definable ranges such as an Opal drive, the portions or partitions of the hard disk may be referred to as ranges. In an Opal context, for example, ranges 1-15 may be contiguous groups of logical block addresses (LBA) where range 0 may be "every LBA not in range 1-15." A partition may be a contiguous group of logical block addresses listed in a partition table. In some embodiments, ranges 1-15 may match partition tables. Example embodiments therefore control the enforcement of a write-protected state in a range in which backup data is stored, not by enforcement from the main or primary OS, but instead by a utility OS (or trusted operating system) that protects and restores data managed by the primary OS.

In accordance with an example embodiment, a two part boot sequence may be employed. The drive will first boot into a read-only utility OS (i.e., the trusted operating system), that is separate from the primary OS and is also protected from penetration by an attacker or any ransomware. The trusted operating system is write protected by the drive itself, thus guaranteeing that it cannot be running malware when the system is first booted. The trusted operating system will also be booted from memory, and operate entirely in memory, writing nothing to the disk during its routine operation, and leaving no remnant when the system reboots.

During the initial boot, which happens each time the system is powered on, the trusted operating system may engage in a number of operations. The operations may include a check to see if the primary OS has any files that need to be backed up. This check can be performed by scanning the write-protected range of the drive for backed up files, and scanning the primary OS's data range for any different files. Differences can be detected in many ways, including checking a timestamp, checking cryptographic hashes of files, checking for content changes, and any other data-related and file system-related ways. If changes are detected by the trusted operating system, the trusted operating system may then retrieve the necessary privilege (e.g., keys) to write the files needing backup to a write-protected range of the drive by temporarily disabling the write protection. Thus, the backup of the files may be executed on a normally write-protected range of the drive via temporary removal of the write protection using authorization that is never exposed outside the trusted operating system. Thereafter, the write protection of the range can be re-enabled, and boot to the primary OS may be conducted. Of note, if there are no files needing backup, then the process can proceed directly from the determination regarding whether files need to be backed up to the boot of the primary OS.

The keys or password necessary to temporarily disable the write protection are protected by TPM. Thus, by using TPM, a sealing mechanism of the TPM can ensure that no other OS besides the trusted operating system will gain access to the keys or password. Generally speaking, when the write-protected range is set up, the password or key that can be used to change the state of the write-protected range (between write-protected and write-enabled states) is provided. The password or key can also be used, for example, to set a ShadowMBR (master boot record) "done" bit. The password or key can either be an administrator password or that of a user, which has been associated with the range. The password or key may be a unique number, generated randomly either from the drive or by asking the TPM (or both).

Alternatively, the password or key may be a user-chosen, one-time random number. The password or key may be stored using the TPM, and may be locked so that the TPM may release the password or key only if certain platform configuration registers (PCRs) correspond to a boot sequence that shows the that trusted operating system was booted first. In some cases, this may be accomplished by storing a random number in a non-volatile memory location in the TPM, which is sealed (e.g., encrypted with a key that can only be used when certain PCRs match specified values). Alternatively, this may be accomplished by sealing the value to those PCRs, and encrypting it with a public key, which the TPM either has in persistent memory or can regenerate and load. Data sealed by the TPM can be stored safely in the trusted operating system since it is stored as an encrypted blob.

As another alternative, an additional PCR may be included in the PCRs that are used to lock the sealed password. This PCR may be either an unused PCR or resettable PCR. The PCR could be loaded with a sealing password that would be extended into the PCR. If using the resettable PCR, this would help ensure that the sealed password cannot be unlocked unless the administrator has approved its unlocking (not just that the state is correct based on the other PCRs). This may provide another layer of security to ensure that the sealed password is only accessible when all conditions are met.

Once the trusted operating system has unsealed and retrieved the sealed password, it may "extend" at least one of the PCRs to which the password is sealed with a random value. The PCR will thereby be changed away from its authorized unlock value, preventing the TPM from unsealing the password after the trusted operating system is finished (e.g., during a planned or unexpected warm restart of the primary OS). Other than PCR values, optionally, an additional user password may be required to unlock the write-protected range password value.

Figure 1:
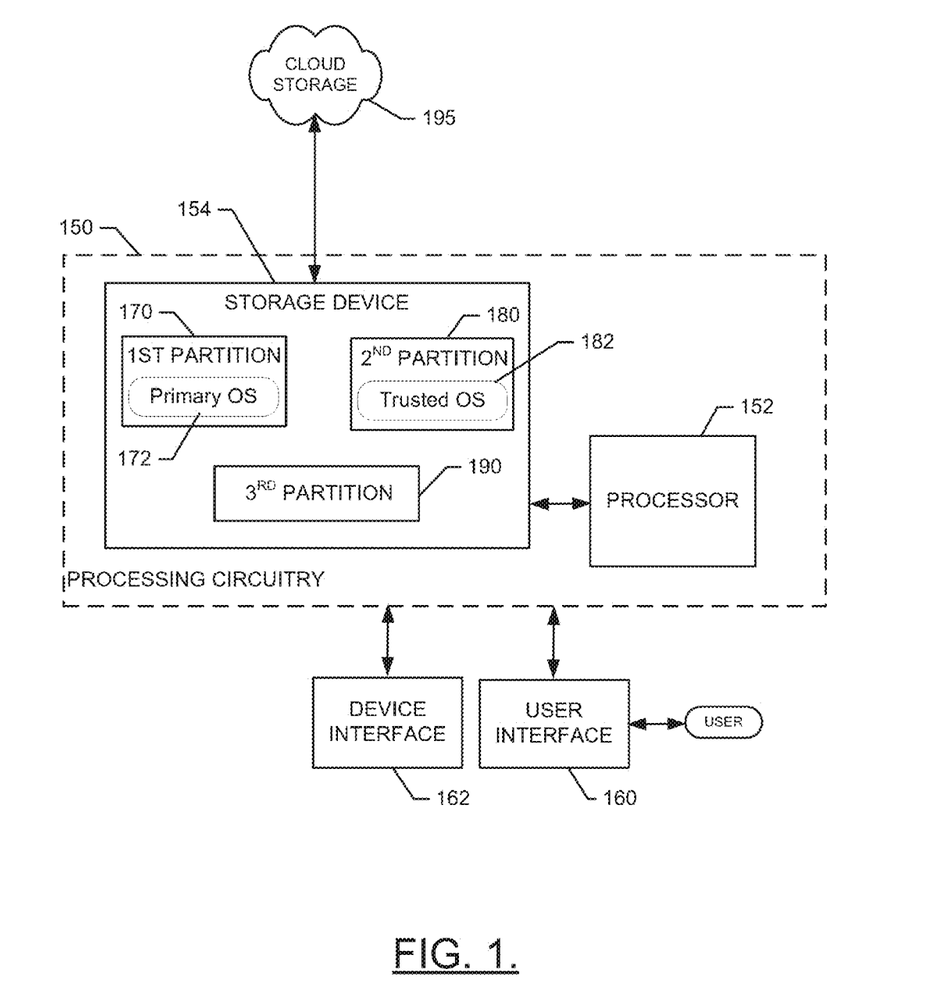
FIG. 1 illustrates a functional block diagram of a system that may be useful in connection with preventing access by malware to locally backed up files according to an example embodiment.

An example embodiment of the invention will now be described in reference to FIG. 1, which illustrates an example apparatus or system in which an example embodiment may be employed. FIG. 1 shows certain elements of an apparatus for provision of protection from ransomware and other malware according to an example embodiment. The apparatus of FIG. 1 may be employed, for example, on a platform such as, for example, a personal computer, laptop computer, hand held computing device, network terminal, or the like. Furthermore, it should be noted that some of the devices or elements described herein may not be mandatory and thus some may be replaced with equivalent structures or even omitted in certain embodiments.

Referring now to FIG. 1, an apparatus for provision of protection from ransomware may include or otherwise be in communication with processing circuitry 150 that is configured to perform data processing, application execution and other processing and management services according to the needs of the particular platform upon which the processing circuitry 150 resides. In one embodiment, the processing circuitry 150 may include a storage device 154 (or memory) and a processor 152 that may be in communication with or otherwise control a local or remote user interface 160 and a device interface 162. As such, the processing circuitry 150 may be embodied as a circuit chip (e.g., an integrated circuit chip) configured (e.g., with hardware, software or a combination of hardware and software) to perform operations described herein. However, in some embodiments, the processing circuitry 150 may be embodied as a portion of a server, computer, laptop, workstation or even one of various mobile computing devices.

The user interface 160 (if present) may be in communication with the processing circuitry 150 to receive an indication of a user input at the user interface 160 and/or to provide an audible, visual, mechanical or other output to the user. As such, the user interface 160 may include, for example, a keyboard, a mouse, a joystick, a display, a touch screen, a microphone, a speaker, a cell phone, or other input/output mechanisms. In embodiments where the apparatus is embodied at a server or other network entity, the user interface 160 may be limited or even eliminated in some cases. Alternatively, the user interface 160 may be remotely located.

The device interface 162 may include one or more interface mechanisms for enabling communication with other devices and/or networks. In some cases, the device interface 162 may be any means such as a device or circuitry embodied in either hardware, software, or a combination of hardware and software that is configured to receive and/or transmit data from/to a network and/or any other device or module in communication with the processing circuitry 150. In this regard, the device interface 162 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 162 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 154 may include one or more non-transitory storage or memory devices such as, for example, volatile and/or non-volatile memory that may be either fixed or removable. The storage device 154 may be configured to store information, data, applications, instructions or the like for enabling the apparatus to carry out various functions in accordance with example embodiments of the present invention. For example, the storage device 154 could be configured to buffer input data for processing by the processor 152. Additionally or alternatively, the storage device 154 could be configured to store instructions for execution by the processor 152. As yet another alternative, the storage device 154 may include one of a plurality of databases that may store a variety of files, policies, instructions, contents or data sets. More particularly, in some cases, the storage device 154 may be partitionable memory that may have access control policies associated with respective ones of the partitions or ranges defined thereat.

In an example embodiment, the storage device 154 may include a first partition 170 associated with a primary OS 172, a second partition 180 associated with a trusted OS 182, and a third partition 190, at which backup files can be stored for the primary OS 172 under write-protection enforced by the trusted OS 182. The first partition 170 may therefore be a range that is read-write capable. The second partition 180 may be read only, and the third partition 190 may (in one example) normally be read only, but may be capable of either having a state change or boundary change implemented to change state for all or a portion thereof to allow writing under certain controlled circumstances as described herein. However, as will be discussed in greater detail below, the third partition 190 may be configured differently in other examples (e.g., the examples shown in FIGS. 3 and 4 below).

As described above, the trusted OS 182 may be booted to initially in order to determine if any data in the first partition 170 (i.e., data associated with the primary OS 172) needs to be backed up. If data needing to be backed up is discovered, the trusted OS 182 may retrieve the key or password that enables the normally read only third partition 190 to be entirely or partially unlocked for write access, to enable the data to be backed up in the third partition 190. After the data is backed up, the third partition (or portion thereof) may then be returned to the read only state.

The backup option may be executed each time the corresponding computer is initially booted. However, the backup option may also be executed periodically for other reasons as described in greater detail below. In either case, it should be appreciated that the third partition 190 may eventually fill up. Accordingly, the trusted OS 182 may be configured to employ a password or key, which can either be derived from the sealed password described above using standard key derivation functions (KDFs) as described in the NIST standards, or which can be separately sealed as described above, to enable access to a remote storage device (e.g., cloud storage 195) or a removable storage device. The contents of the third partition 190 may be provided to the cloud storage 195 so that the third partition 190 can be cleared to make room for continued local backup of files associated with the first partition 170, and the primary OS 172. It should also be noted that the trusted OS 182 could be provided on a removable storage device, in some embodiments. In such examples, the system may be set to cold boot into the removable storage device and perform a check to see if a cold or warm boot was performed. If a cold boot was performed, the system may behave normally. However, if a warm boot was performed, a utility boot OS/loader may proceed to boot to the internal storage media having the primary OS 172. If this type of implementation was employed, the removable storage device may be preconfigured and be ready to be plugged in to any computer to change the BIOS settings to boot from the removable storage device.

Figure 2:
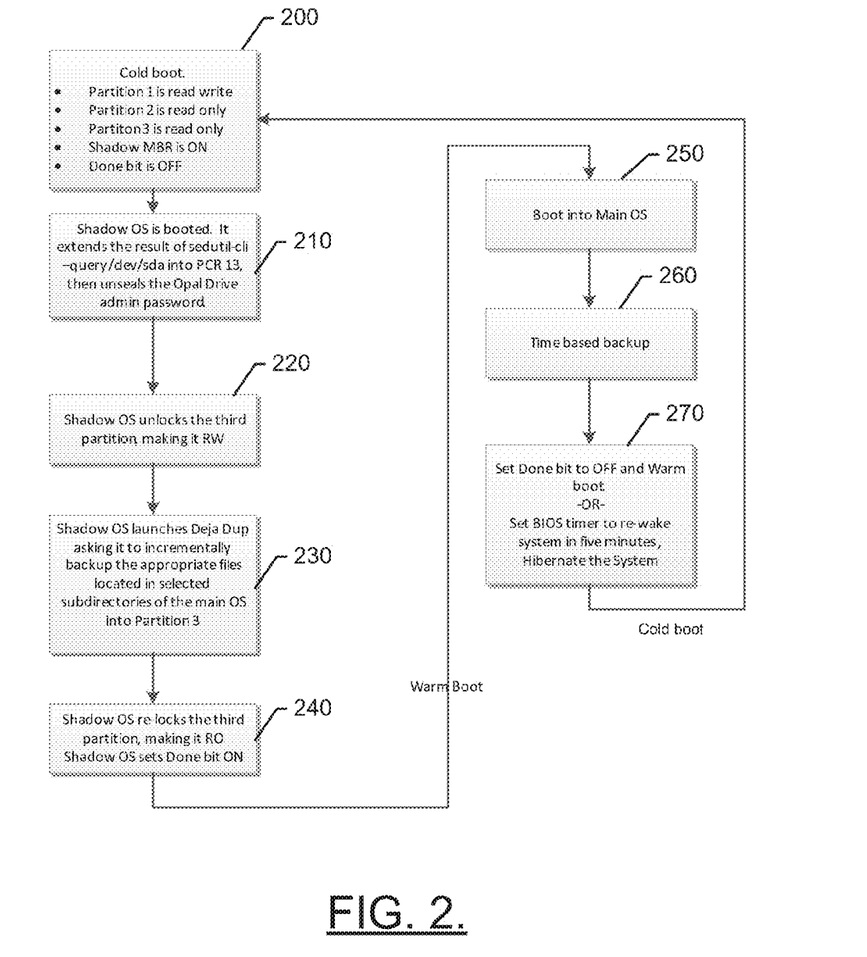
FIG. 2 illustrates a block diagram showing operations associated with implementation of the system of FIG. 1 according to an example embodiment.
Figure 3:
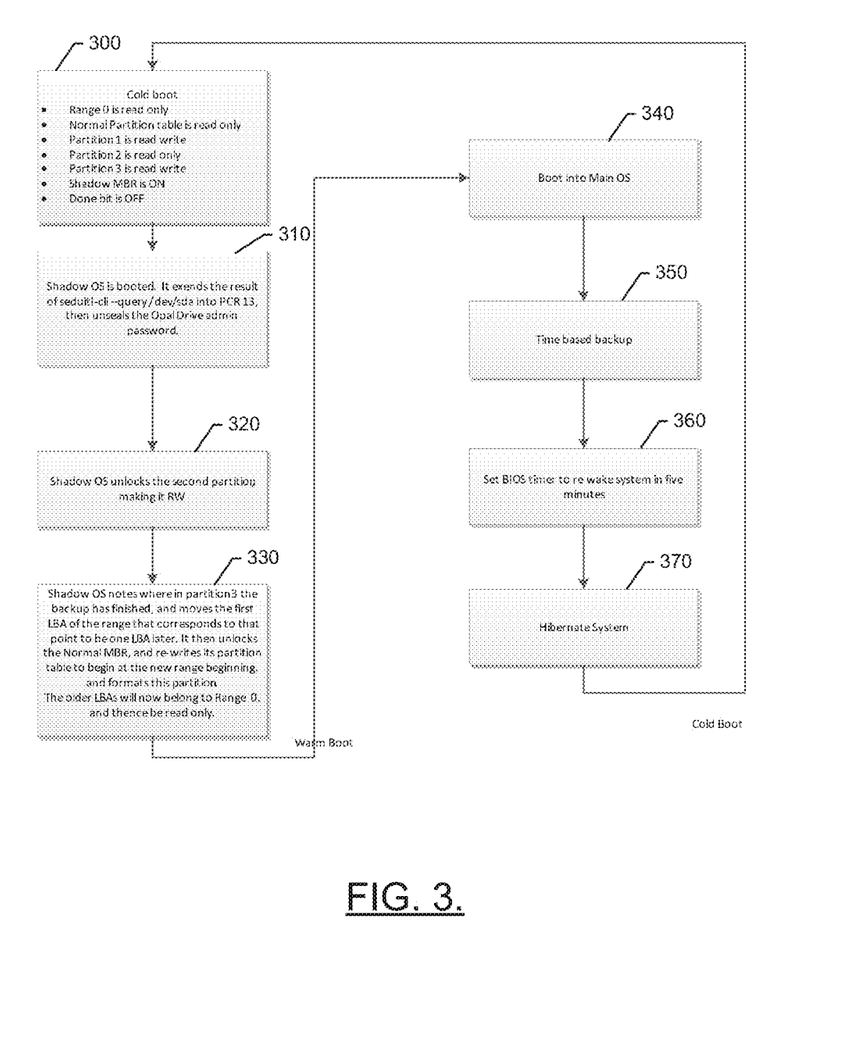
FIG. 3 illustrates a block diagram showing operations associated with another implementation of the system of FIG. 1 according to an example embodiment.
Figure 4:
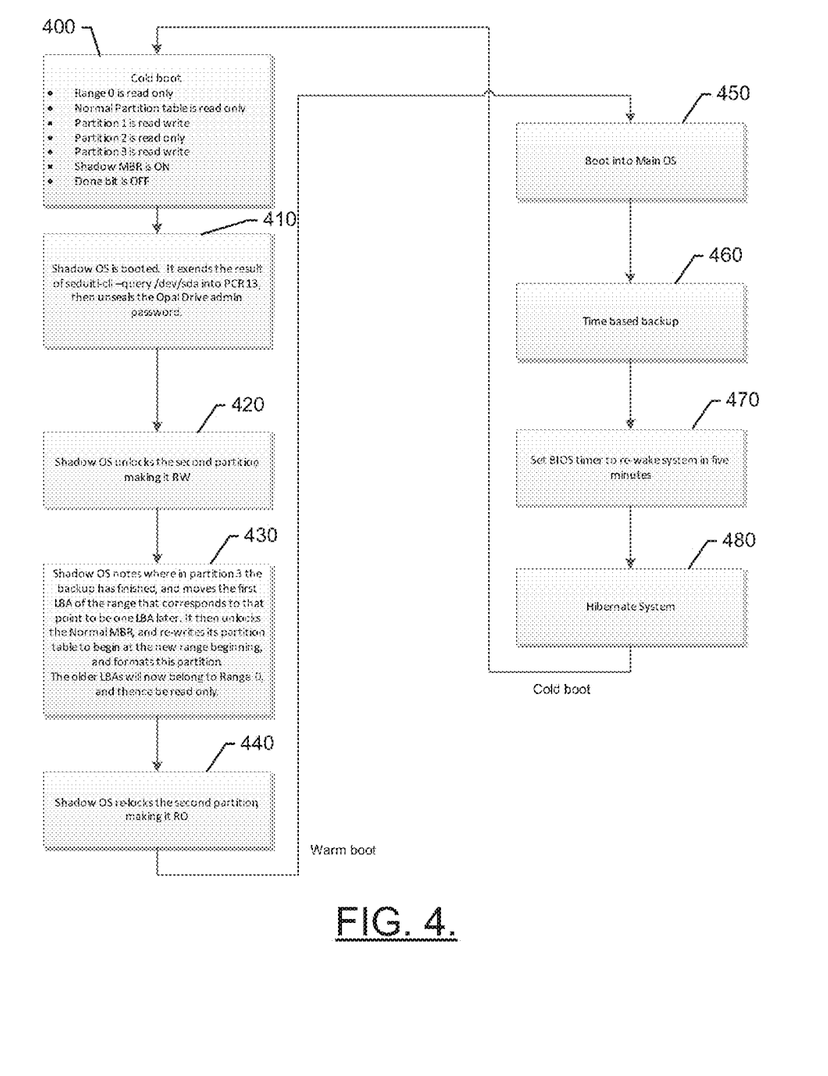
FIG. 4 illustrates another block diagram showing operations associated with yet another alternative implementation of the system of FIG. 1 according to an example embodiment.

FIGS. 2-4 illustrate some specific (non-limiting) examples of how the boot cycle may proceed in accordance with some example embodiments. In this regard, FIG. 2 illustrates a block diagram showing operations associated with implementation of one example embodiment. In this example, a cold boot is initially performed at operation 200. One portion of the disk drive (e.g., the Opal drive) may include partition tables and MBR for the drive, which may be a read only portion of the disk drive to prevent being over-written by any malware. Another portion of the drive may include the primary OS 172 (e.g., in the first partition 170). Of note, the first partition 170 is initially read-write, the second partition 180 (which includes the trusted OS 182) is read only, and the third partition 190 is read only at this time. The state of the third partition 190, in this example, is enforced by the Opal drive itself, and can only be changed with knowledge of the Opal drive administrator password, which is not present at this time.

The Opal drive will initially have its ShadowMBR bit enabled or set to ON, and the "done" bit (i.e., the MBR-DONE bit) is set to CLEAR or OFF. In this state, upon power on, the drive will boot from the partition table and MBR located in the ShadowMBR, a region which can only be written with knowledge of the Opal drive administrator password.

Thereafter, upon booting, the system will measure its boot state (e.g., BIOS, System ROMs, etc.) into the TPM PCRs as described above. This also measures the MBR into a PCR. The MBR measured will be one which in turn will measure the kernel of the trusted OS 182, which it points to. Use of Trusted Grub2 for the MBR may be one way of providing for this occurrence.

The trusted OS 182 may then measure the state of the Opal drive's ShadowMBR and MBRDone bits, and extend those into a TPM PCR at operation 210. Use of the sedutil-cli—query/dev/sda command can provide the state of these bits, and standard means (e.g., use of the TrouSerS software) can be used to then extend the result of this operation into a PCR. Thereafter, at operation 220, the trusted OS 182 may unseal the Opal drive password from an encrypted data blob via TrouSerS and the TPM. In some cases, the sealing of the password may have been to the state of the TPM's PCRs when the system is booted with the ShadowMBR=enabled and the MBRDone bit being off into the correct MBR and the trusted OS 182. The unsealing may therefore only expose the password to the trusted OS 182. After the trusted OS 182 has the password, the trusted OS 182 can make the third partition 190 read/write.

The first partition 170 may be (or have been) scanned by or under the control of the trusted OS 182 for any data in identified directories or subdirectories that has changed since the last scan. Incremental updates may be saved to the third partition 190 at operation 230, and no data may generally ever be erased from the third partition 190, as only changes are saved. At operation 240, the third partition 190 may be reset to be read only again. At this point, the trusted OS 182 may change the MBRDone bit to ENABLED or ON. When this is done, the next warm boot of the system will no longer see the ShadowMBR, but instead will see the NormalMBR, which will boot the system into the first partition 170 and the primary OS 172 at operation 250.

Reverting to the option of making periodic backups, it may be possible to implement periodic time based backups at operation 260. To achieve such a backup strategy, the system may be set to hibernate at a convenient time, for example when the system is not actively executing user requests, or other background tasks are at a minimum. A timer may be set to wake the system up at a later time, and a "done bit password," which only has the ability to set the MBRdone bit to CLEAR may be used. Thereafter, the system may again be set to hibernate. When the system wakes up, the system will have gone through a power off cycle, which will then proceed to go through the backup process as described herein. After the backup process is completed, the system will be rebooted into the hibernated system as shown by operation 270.

FIG. 3 shows a block diagram for a slightly different embodiment. In the example of FIG. 3, a cold boot is initially performed at operation 300. An initial range (Range 0) may be read only, and a normal partition table may also be read only. In this example, the first partition 170 is read/write, and the second partition 180 is read only. The third partition 190 is read/write as well, but will have its boundaries movable to make portions that were initially read/write convert to be read only. The ShadowMBR may be ON, and the "done" bit may be OFF to ensure that the trusted OS 182 (or shadow OS) is booted. At operation 310, the shadow OS is booted and the password may be unsealed (similar to the description above). Thereafter, at operation 320, the shadow OS unlocks the second partition 180 (which again is initially read only in this example) to make the second partition 180 read-write and backup data is written to the third partition 190.

At operation 330, the shadow OS then notes where in the third partition 190 the backup finished, and the first logical block array (LBA) of the range that corresponds to that point is moved to one LBA later. The Normal MBR is then unlocked, and the partition table is rewritten to begin at the new range beginning, and the partition is formatted accordingly. Older LBAs will now belong to Range 0 and thereafter be read only.

Essentially, the example of FIG. 3 uses the primary OS 172 to do backups to the third partition 190 (which is again read/write), and then, when the trusted OS 182 gets control, the trusted OS 182 changes the boundaries between the third partition 190 and the second partition 180 to make the backed up data thereafter reside in the read only range of the second partition 180. Thus, again, the trusted OS 182 is responsible to control access to the ability to change the state of the portion of the storage device to which the backup data is written in order to protect the backup data after it has been saved to prevent unauthorized encryption. Thereafter, at operation 340, the system is warm booted to the primary OS 172. Time based backup (operation 350), delayed awakening (operation 360) and system hibernation (operation 370) may operate similar to the descriptions above in reference to FIG. 2. An advantage of this example may be that the primary OS 172 is not out of action for very long, as the actions associated with this example can be done by the trusted OS 182 in a relatively short time (e.g., in a matter of seconds).

FIG. 4 illustrates still another example that is only slightly different from the example shown in reference to FIG. 3. In this regard, the example of FIG. 4 provides for the primary OS 182 to be responsible for making periodic backups into a read/write partition (e.g., the third partition 190). Thus, operations 400 to 430 and 340 to 370 generally correlate to operations 300 to 330 and operations 450 to 480 above, respectively. However, the example of FIG. 4 adds operation 440 to re-lock the second partition to make it read only after boundaries of the third partition 190 have been changed. Thus, the third partition 190 of this example is a part of the global range of an Opal drive. When the trusted OS 182 gets control, the trusted OS 182 creates a new (non-global) range which contains a subset of the third partition 190. This range can be anywhere inside the third partition 190 as long as it includes contiguous LBAs. This range is then marked as read only to prevent changes to files stored in those LBAs.

Figure 5:
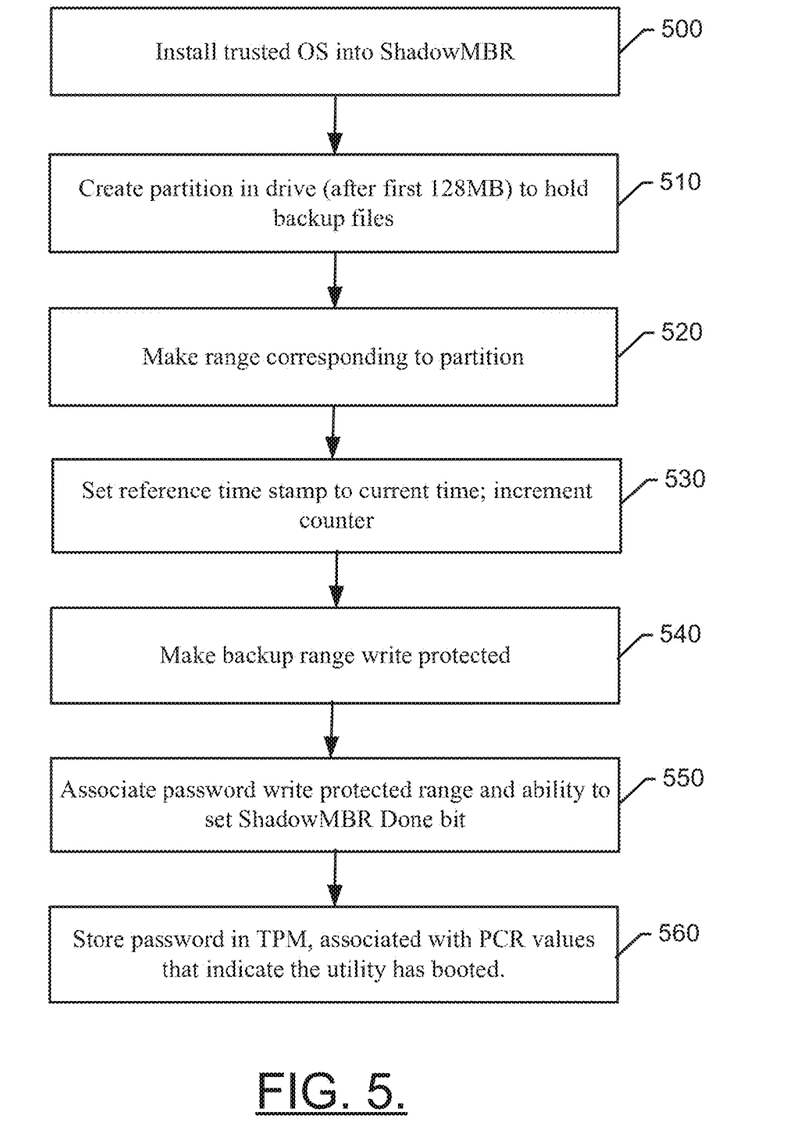
FIG. 5 illustrates a block diagram showing operations associated with setup of a system that may operate in accordance with an example embodiment.

FIG. 5 illustrates a block diagram showing operations associated with setup of a system that may operate in accordance with an example embodiment. As shown in FIG. 5, a trusted OS is installed into the ShadowMBR at operation 500. Partitions are then created in the drive (e.g., after the first 128 MB) to hold backup files at operation 510. A range may then be made corresponding to the partitions at operation 520. The range may, in some cases, be formatted with a file system that retains all prior files and does not overwrite deleted files, but rather keeps old data available for restoration and therefore does not "forget" anything such as the Elephant file system. At operation 530, the reference time stamp may be set to the current time, and a counter may be incremented. This is done because even if malware alters the clock, the malware cannot modify any read only counter value that the utility reads, then increments, then makes read only. Thereafter, the backup range may be write-protected at operation 540. An association may then be made, at operation 550, between the password write protected range and the ability to set the ShadowMBR "done" bit. The password may then be stored in TPM associated with PCR values that indicate that the trusted OS has booted at operation 560.

Figure 6:
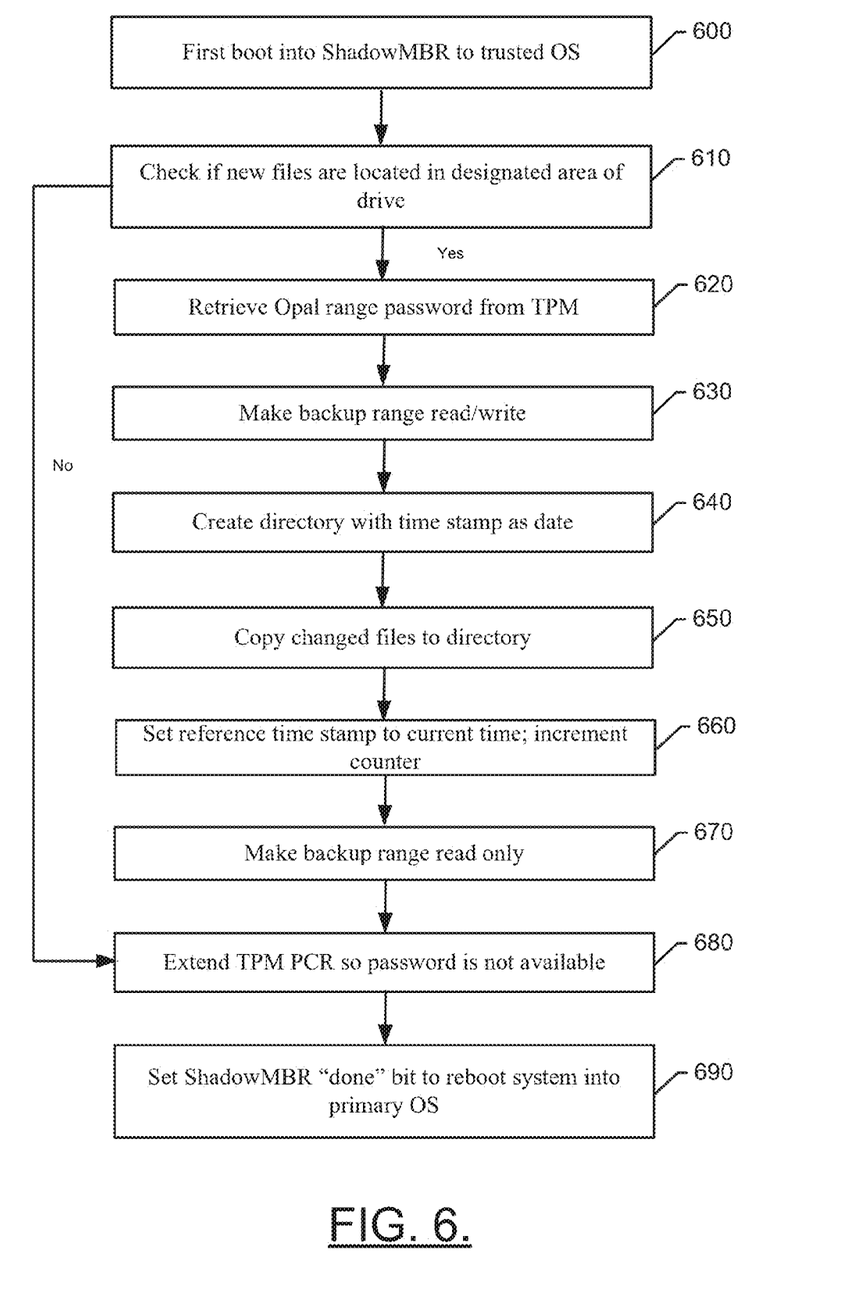
FIG. 6 illustrates a block diagram showing operations associated with operation of the system set up via the operations of FIG. 5 in order to enable the system to operate in accordance with an example embodiment.

FIG. 6 illustrates a block diagram showing use of the system after the setup of FIG. 5. As shown in FIG. 6, the system initially boots into the ShadowMBR to the trusted OS at operation 600. A check is them performed, at operation 610, to determine whether any new files (e.g., newly modified files or newly created files) are located in a designated area of the drive. If there are new files, then the password is retrieved at operation 620 so that the backup range can be altered to a read/write state (from the read only state) at operation 630. A directory may then be created with the current time stamp at operation 640 and changed files are copied to the directory at operation 650. At operation 660, the reference time stamp may be updated to the current time before the backup range is reverted to the read only state and the counter may be incremented at operation 670 (for reasons similarly discussed above at operation 530). At operation 680, the TPM PCR is extended so that the password is no longer available. Then at operation 690, the ShadowMBR "done" bit is set and the system is rebooted to the primary OS. Of note, if the check at operation 610 determines that there are no new files, then flow proceeds directly from operation 610 to operation 680.

Figure 7:
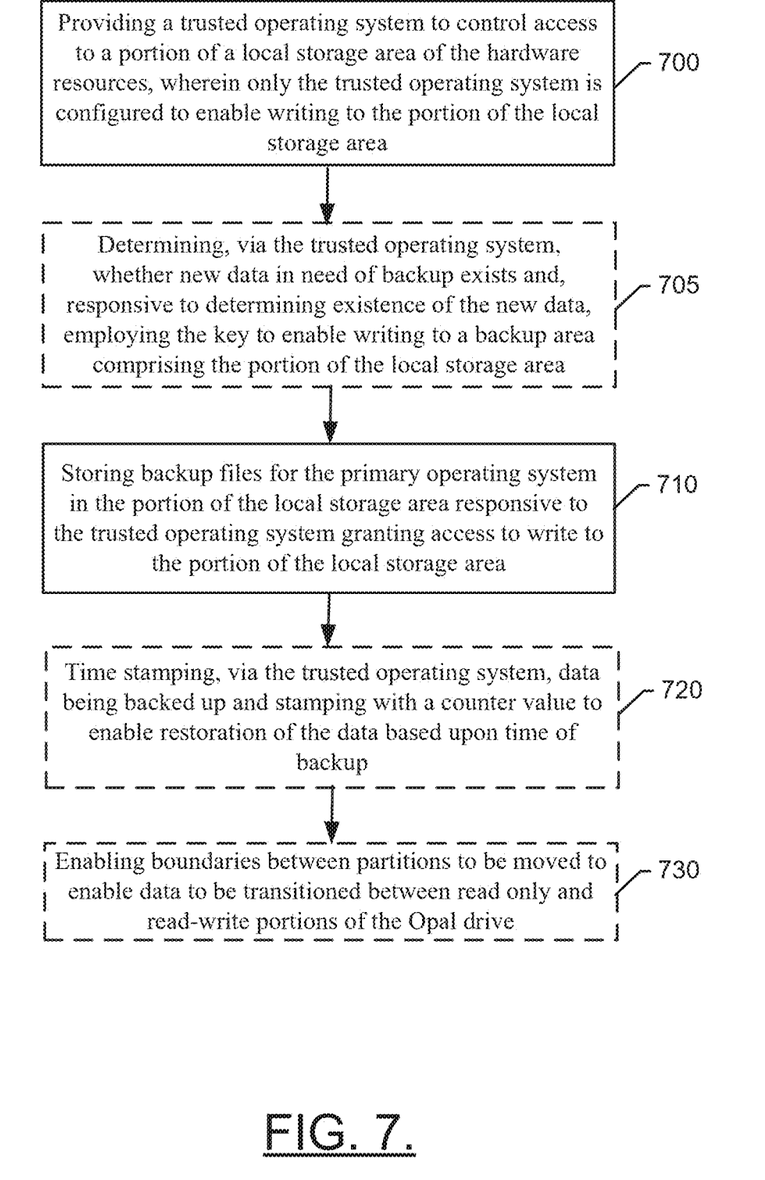
FIG. 7 illustrates a method of preventing access by malware to locally backed up files according to an example embodiment.

From a technical perspective, the platform described in FIG. 1 may be used to facilitate the implementation of several computer program and/or network communication based interactions including those shown in FIGS. 2-7. FIG. 7 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software. Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method for protecting against malware according to one embodiment of the invention, as shown in FIG. 3, may include providing a trusted operating system to control access to a portion of a local storage area of the hardware resources at operation 700. In this context, only the trusted operating system may be configured to enable writing to the portion of the local storage area. The method may further include storing backup files for the primary operating system in the portion of the local storage area responsive to the trusted operating system granting access to write to the portion of the local storage area at operation 710.

In an example embodiment, the method may include various optional or additional operations, which are shown in dashed lines in FIG. 7. For example, the method may further include determining, via the trusted operating system, whether new data in need of backup exists and, responsive to determining existence of the new data, employing the key to enable writing to a backup area comprising the portion of the local storage area at operation 705. In some cases, the method may further include time stamping, via the trusted operating system, data being backed up and stamping with a counter value to enable restoration of the data based upon time of backup at operation 720. Additionally, in some cases, the method may further include enabling boundaries between partitions to be moved to enable data to be transitioned between read only and read-write portions of the Opal drive at operation 730.

Other modifications may also be provided either alone or in combination with each other. For example, in some cases, the portion of the local storage area may be normally maintained in a read only state, and storing the backup files may include enabling, via the trusted operating system, writing to the portion of the local storage area via controlling access to a key accessible only to the trusted operating system. Additionally, for example, the key may only be available to the trusted operating system responsive to determining a predefined boot sequence was employed. In some cases, after writing to the backup area, the trusted operating system makes the backup area read only before transferring control to the primary operating system. In an example embodiment, the trusted operating system may not store any pre-extant data in the backup area. In an example embodiment, the local storage area may include an Opal drive having at least a first partition including the primary operating system, a second partition including the trusted operating system, and a third partition including the portion of the local storage area. The second partition may be read only. In such a context, the predefined boot sequence may include upon booting, ensuring that the Opal drive boots from the second partition comprising the trusted operating system before primary operating system booting.

In some cases, the trusted operating system may be a program storage device readable by machine, tangibly embodying a program of instructions executable by the machine to perform acts including, for example, providing a main memory in communication with a physical computing device, providing a vault memory in communication with the physical computing device where the vault memory is read only with respect to the main memory, and receiving, at the physical computing device, upon being booted from the system, one or more passwords from a TPM associated with the system allowing it to manage the vault memory, which it will then change to being read-write, copy data to be backed up and then restore the read only setting to the vault memory.

In an alternative embodiment, the trusted operating system may be the same as described above except that the acts include: providing a main memory in communication with a physical computing device; providing a vault memory in communication with the physical computing device, the trusted operating system being read only with respect to the main memory; receiving, at the physical computing device, upon being booted from the system, one or more passwords from a TPM associated with the system allowing it to manage the vault memory, which it will then change the starting LBA value of the vault memory, thus shrinking that memory, and re-associating the removed memory with an area of the storage media which is enforced as being read-write.

In another alternative embodiment, the trusted operating system may be the same as described above except that the acts include: providing a main memory in communication with a physical computing device; providing a vault memory in communication with the physical computing device, the trusted operating system being read only with respect to the main memory; receiving, at the physical computing device, upon being booted from the system, one or more passwords from a TPM associated with the system allowing it to manage the vault memory, which it will then create a new range of LBAs which overlap part of the vault memory, thus associating those LBAs with the new range, disassociating them from the vault memory. The new range is then set to be read only, thus shrinking the vault memory.

Example embodiments may therefore enable storage of backup files in a manner that is inaccessible to ransomware. However, it should be appreciated that example embodiments protect against more than just ransomware. In this regard, example embodiments may protect against any modification by malware of files that were protected before the malware infected the system such as malware that infects files to try to provide resilience to the malware. When an attack occurs, the primary OS can be re-installed or de-infected and files copied back from the protected backup provided by example embodiments. Thereafter, continued backup to a protected range may continue in the manner described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method for providing malware protection in connection with processing circuitry including hardware resources and software resources managed by a primary operating system, the method comprising:
   providing a trusted operating system to control access to a portion of a local storage area of the hardware resources, wherein only the trusted operating system is configured to enable writing to the portion of the local storage area, wherein the local storage area comprises a drive that is access restrictable based on definable ranges comprising at least a first partition including the primary operating system, a second partition including the trusted operating system that is read only, and a third partition including the portion of the local storage area; and
   storing backup files for the primary operating system in the portion of the local storage area responsive to the trusted operating system granting access to write to the portion of the local storage area, wherein the portion of the local storage area is normally maintained in a read only state, and wherein storing the backup files comprises enabling, via the trusted operating system, writing to the portion of the local storage area via controlling access to a key accessible only to the trusted operating system, and the key is only available to the trusted operating system responsive to determining a predefined boot sequence was employed.

2. The method of claim 1, further comprising time stamping, via the trusted operating system, data being backed up to enable restoration of the data based upon time of backup.

3. The method of claim 1, further comprising determining, via the trusted operating system, whether new data in need of backup exists and, responsive to determining existence of the new data, employing the key to enable writing to a backup area comprising the portion of the local storage area.

4. The method of claim 3, wherein after writing to the backup area, the trusted operating system makes the backup area read only before transferring control to the primary operating system.

5. The method of claim 3, wherein the trusted operating system does not store any pre-extant data in the backup area.

6. The method of claim 1, wherein the predefined boot sequence comprises, upon booting, ensuring that the drive boots from the second partition comprising the trusted operating system before primary operating system booting.

7. The method of claim 1, further comprising enabling boundaries between partitions to be moved to enable data to be transitioned between read only and read-write portions of the drive.

8. An apparatus for providing malware protection, the apparatus comprising processing circuitry including hardware resources and software resources managed by a primary operating system, the apparatus further including a trusted operating system configured to control access to a portion of a local storage area of the hardware resources,
   wherein the local storage area comprises a drive that is access restrictable based on definable ranges comprising at least a first partition including the primary operating system, a second partition including the trusted operating system, and a third partition including the portion of the local storage area, wherein the second partition is read only;

wherein the portion of the local storage area stores backup files for the primary operating system and is normally maintained in a read only state, and wherein the trusted operating system is configured to enable writing to the portion of the local storage area via controlling access to a key accessible only to the trusted operating system, and the key is only available to the trusted operating system responsive to determining a predefined boot sequence was employed; and wherein only the trusted program operating system is configured to enable writing to the portion of the local storage area.

9. The apparatus of claim 8, wherein the trusted operating system time stamps data being backed up to enable restoration of the data based upon time of backup.

10. The apparatus of claim 8, wherein the trusted operating system determines whether new data in need of backup exists and, responsive to determining existence of the new data, employing the key to enable writing to a backup area comprising the portion of the local storage area.

11. The apparatus of claim 10, wherein after writing to the backup area, the trusted operating system makes the backup area read only before transferring control to the primary operating system.

12. The apparatus of claim 10, wherein the trusted operating system does not store any pre-extant data in the backup area.

13. The apparatus of claim 8, wherein the predefined boot sequence comprises, upon booting, ensuring that the drive boots from the second partition comprising the trusted operating system before primary operating system booting.

14. The apparatus of claim 8, wherein boundaries between partitions are movable to enable data to be transitioned between read only and read-write portions of the drive.

* * * * *